(12) United States Patent
Ejerhed

(10) Patent No.: US 6,385,630 B1
(45) Date of Patent: May 7, 2002

(54) METHOD FOR NORMALIZING CASE

(75) Inventor: Eva Ingegerd Ejerhed, Stockholm (SE)

(73) Assignee: Hapax Information Systems AB, Stockholm (SE)

(*) Notice: Subject to any disclaimer, the term of this patent is extended or adjusted under 35 U.S.C. 154(b) by 60 days.

(21) Appl. No.: 09/672,101

(22) Filed: Sep. 29, 2000

(30) Foreign Application Priority Data

Sep. 26, 2000 (SE) ................................. 0003433

(51) Int. Cl.[7] ............................ G06F 17/21; G06K 9/00
(52) U.S. Cl. ............................... 707/531; 704/9; 704/10
(58) Field of Search ............................... 707/530, 531, 707/532, 542; 704/1, 9, 10

(56) References Cited

U.S. PATENT DOCUMENTS

| | | | |
|---|---|---|---|
| 4,830,521 A | | 5/1989 | Sakai et al. |
| 4,864,501 A | | 9/1989 | Kucera et al. |
| 5,008,818 A | * | 4/1991 | Bocast ........................... 714/2 |
| 5,485,372 A | | 1/1996 | Golding et al. |
| 5,819,265 A | | 10/1998 | Ravin et al. |
| 5,995,922 A | * | 11/1999 | Penteroudakis et al. ...... 704/10 |
| RE36,727 E | * | 6/2000 | Kageneck et al. ............. 707/3 |

* cited by examiner

Primary Examiner—Joseph H. Feild
(74) Attorney, Agent, or Firm—Burns, Doane, Swecker & Mathis, L.L.P.

(57) ABSTRACT

A method is disclosed for automatically distinguishing significant from insignificant variants of upper and lower case in a number of input word types by means of a computer. According to the method an input word type is assigned to one of a number of disjoint local groups based on the case, and position, of the letters that make up the input word type. Furthermore, the input word type is assigned to one of a number of disjoint global groups based on which local groups case variants of the input word type are assigned to. Finally the cases of the input word type are normalized in accordance with predetermined rules associated with the global group the input word type is assigned to.

15 Claims, 3 Drawing Sheets

METHOD FOR NORMALIZING CASE

FIELD OF THE INVENTION

The present invention generally relates to the field of computerized analysis, processing and storage of natural language text, and more specifically to a method for distinguishing insignificant from significant distinctions of upper and lower case letters in a number of input word types from a natural language text.

BACKGROUND OF THE INVENTION

When analyzing, processing and storing natural language text several problems arise pertaining to the case of letters in the text. For example, when storing the word types of a large text in a database, the question arises whether a difference only in the case of a letter is relevant or not when distinguishing word types.

Known systems for analyzing, processing and storing word types have two general approaches to handling case distinctions. The two approaches are: (1) to obliterate all distinctions of upper and lower case in unique word types (case insensitivity), or (2) to preserve all case distinctions (case sensitivity). The first approach results in smaller inventories of word types at the cost of loss of the information conveyed by case distinctions, and the second approach results in retention of case information at the cost of larger inventories of word types.

SUMMARY OF THE INVENTION

An object of the present invention is to overcome the problem of loss of information associated with case insensitivity and the problem of large inventories of word types associated with case sensitivity, respectively, whilst at the same time maintaining the advantages of these two approaches. This object is achieved by a method for automatically distinguishing significant from insignificant variants of upper and lower case in a number of input word types according to the accompanying claims.

The invention is based on the recognition that local information, such as the occurrence and location of upper case letters in word types, together with global information, such as the occurrence of word types that only differ with respect to the case of one or more letters, can be used to determine whether the distinction of case of the letter is significant or not.

According to one aspect of the invention, a method for automatically distinguishing significant from insignificant distinctions of upper and lower case in a number of input word types by means of a computer is provided. According to the method an input word type is assigned to one of a number of disjoint local groups based on the case, and position, of the letters that make up the word type. Furthermore, said input word type is reassigned to one of a number of disjoint global groups, based on which local groups the case variants of the input word type are assigned to. Finally cases are normalized for said input word type in accordance with predetermined rules associated with the global group said input word type is assigned to.

According to this aspect of the invention, a large number of word types that have been identified in a very large text database are input to a computer. The word types are input as they appear in the text database, i.e. the cases of the letters of the word types are maintained. Thus, two word tokens in the text database that are identical except for the case of one or more letters will be input as two different word types, whereas two word tokens in the text database that are identical also in terms of the case of the letters will be input as one word type. The method, which is performed fully automatically by means of a computer, then makes use of both local information and global information regarding cases of the word types. The local information is the cases and positions of the letters that make up the word types, such as the case of the initial letter and the case of non-initial letters. As for the global information, the fact that there are word types that differ from each other only with respect to the case of one or more letters is used inventively. These word types are case variants of a common word type. It is recognized that, by determining what different case variants there are for one common word type, it is possible to determine with a reasonable level of certainty if the case difference between the case variants is significant or not and, if it is not, to which case variant the case variants should be normalized. The term assigned in "assigned to a number of disjoint local groups" and "assigned to a number of disjoint global groups" should be interpreted broadly so that it does not only cover an actual grouping of the input word types, but also a more theoretical recognition that there are different types of word types in terms of the local and global properties of concern. Furthermore, the predetermined rules also include rules that detect when no normalization is to be done, which happens when the cases of letters in the word types are considered to be significant. In this way, the cases are preserved for those input word types that do not have any case variants, and for those input word types that have case variants for which the case difference is considered to be significant, whereas the cases are normalized for input word types for which the case difference is considered to be insignificant. An advantage of this method is that the number of word types that, for example, should be stored in a database, is decreased. At the same time, the information conveyed by the case is preserved when the case is considered to be significant. Thus, the size of the database will be decreased which will decrease the costs of the database and increase the speed of look up in the database.

The method is general, language independent, and applicable to character sets of languages for which standard orthography distinguishes upper and lower case of letters. The method has applications in indexing and lookup procedures in systems for information retrieval, and in lexical analysis components of systems for text analysis.

In one embodiment of the method according to the invention, the case variants of an input word type are normalized to a given case variant, that is predetermined for the given global group of the input word type. Thus, for each global group there is one case form that is considered to be the normal form, and all case variants of a word type of a given global group are normalized to that normal form. This is based on the recognition that different types of word types, such as names, acronyms, nouns etc., will occur in a certain set of case variants in a natural language text, and that the set of case variants of a word type that are found in a large natural language text, is indicative of what type of word type the word type is.

In another embodiment of the method according to the invention, each input word type is associated with a frequency that indicates the number of occurrences of the input word type in the natural language text. The case variants of an input word type are then normalized in accordance with predetermined rules associated with (a) the global group that the input word type is assigned to, and (b) the frequency of the case variants of the input word type. Thus, in this embodiment the additional information regarding the number of times each word type has occurred in the natural language text is used in the determination of whether and how an input word type should be normalized. For example, information regarding the frequency of each case variant of a word type may indicate that the default normalization associated with the global group of the case variants should not be applied. Thus, even though there is one form in terms of cases that is considered to be the normal form to which all case variants of a word type should be normalized, this should not be done in some cases. For example, this could be the case when a case variant that is considered to be the normal form has a frequency that is significantly smaller than the frequency of another case variant. This is based on the recognition that, even if the set of case variants that a word type has in a natural language text indicates which type of word type the word type is, there are exceptions to this. These exceptions can be identified by also considering the frequency of each case variant. This enhances the performance of the method in terms of the correctness of the normalization.

In yet another embodiment of the method according to the invention, each input word type is associated with a sentence position that indicates whether the input word type occurred in a sentence internal position and/or in a sentence initial position in the natural language text. The case variants of an input word type are then normalized in accordance with predetermined rules referring to the global group of the input word type and to the sentence positions of the case variants of said input word type. Also in this embodiment, information regarding each specific group of case variants can be weighed in when determining whether and how an input word type should be normalized. For example, information regarding the sentence position of each case variant of a word type may indicate that the default normalization associated with the global group of the case variants should not be applied. Thus, even though there is one case form that is considered to be the normal form to which all case variants of a word type should be normalized, this should not be done in some cases. For example, when one case variant with an upper case initial letter and another case variant with a lower case initial letter both appear in internal positions of sentences in the natural text, this indicates that the case difference is significant and that no normalization should be done. This is based on the recognition that, even if the set of case variants of a word type indicates which kind of word type the word type is, there are exceptions to this. These exceptions can be identified by also considering in which sentence positions each case variant has occurred. This enhances the performance of the method in terms of preserving significant case differences.

BRIEF DESCRIPTION OF THE DRAWINGS

In the following, the present invention is illustrated by way of example and not limitation with reference to the accompanying drawings, in which.

DETAILED DESCRIPTION OF THE INVENTION

Figure 1:
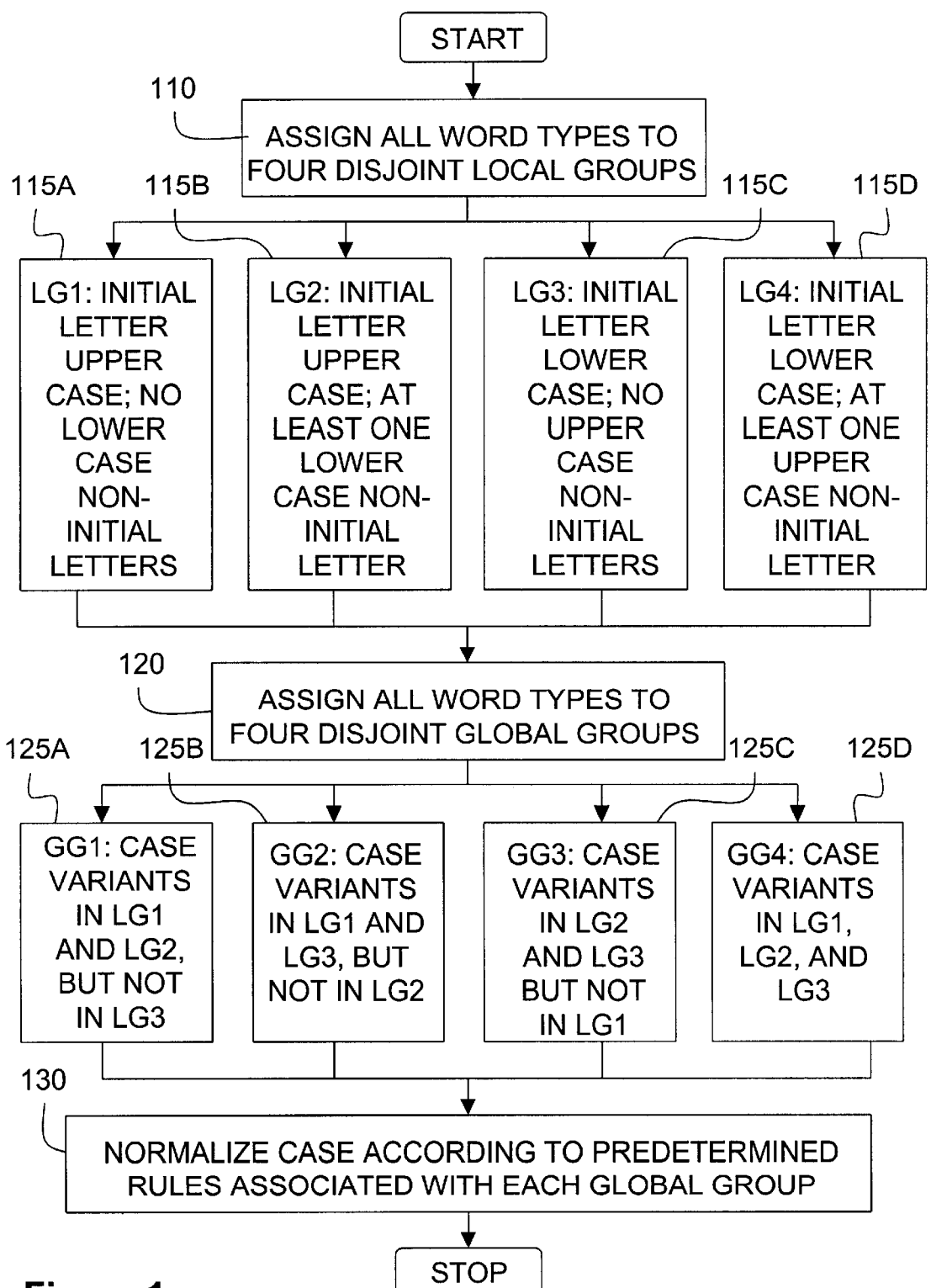
FIG. 1 is a flowchart of a first embodiment of a method according to the invention.

In FIG. 1 a flowchart of a first embodiment of a method according to the invention is shown. A number of word types have been identified in a large text database comprising natural language text. The word types are then input to a computer or the like. The word types are input as they appear in the text database, i.e. the cases of the letters of the word types are maintained. Thus, two word tokens in the text database that are identical except for the case of one or more letters will be input as two different word types, whereas two word tokens in the text database that are identical also in terms of the case of the letters will be input as one word type. Word types that differ from each other only with respect to the case of one or more letters will be called case variants of a common word type in the following. According to the embodiment of the method each word type that begins with an alphabetic character is assigned to one of four disjoint local groups in step 110. A word type is assigned to a local group on the basis of the case of the initial letter of the word type and the case of non-initial letters of the word type. More specifically, in step 115A, each word type that has an upper case initial letter and no lower case non-initial letters is assigned to a first local group (LG1). In step 115B, each word type that has an upper case initial letter and at least one lower case non-initial letter is assigned to a second local group (LG2). In step 115C, each word type that has a lower case initial letter and no upper case non-initial letters is assigned to a third local group (LG3). In step 115D, each word type that has a lower case initial letter and at least one upper case non-initial letter is assigned to a fourth local group (LG4). After the identification of the local information, i.e. the information that can be found by just considering each word type in its local contexts of occurrence, each word type is reassigned to one of four disjoint global groups in step 120. A word type is reassigned to a global group on the basis of the local groups to which the case variants of the word type are assigned. The identification of case variants, i.e. word types that are equal to each other except for the case of one or more letters, can be done in several different ways that are obvious to a person skilled in the art. When all case variants have been found for a common word type, the local groups to which the case variants are assigned are identified. If at least one case variant of a word type is assigned to the first local group, and at least one case variant of the word type is assigned to the second local group, and no case variant of the word type is assigned to the third local group, then the word type is assigned to a first global group (GG1) in step 125A. If at least one case variant of a word type is assigned to the first local group, and at least one case variant of the word type is assigned to the third local group, and no case variant of the word type is assigned to the second local group, then the word type is assigned to a second global group (GG2) in step 125B. If at least one case variant of a word type is assigned to the second local group, and at least one case variant of the word type is assigned to the third local group, and no case variant of the word type is assigned to the first local group, then the word type is assigned to the third global group (GG3) in step 125C. If at least one case variant of a word type is assigned to the first local group, and at least one case variant of the word type is assigned to the second local group, and at least one case variant of the word type is assigned to the third local group, then the word type is assigned to the fourth global group (GG4) in step 125D. In this way global information, i.e. information that can be found by analyzing the occurrence of a word type and case variants of the word type in an entire text database, is identified. The global information is then used in step 130 when normalizing the cases for the word types according to predetermined rules associated with each global group. The predetermined rules are based on empirical knowledge of the significance of cases for word types that occur as certain case variants in a text database, and of the most probable normal form in terms of cases for these word types. In this embodiment each input word type assigned to the first global group is normalized according to the case variant of the word type that is assigned to the second local group. Each input word type assigned to the second global group is normalized according to the case variant of the word type that is assigned to the third local group. Each input word type assigned to the third global group is normalized according to the case variant of the word type that is assigned to the third local group. Each input word type assigned to the fourth global group is normalized according to the case variant of the word type that is assigned to the second local group.

To exemplify the embodiment described with reference to FIG. 1, four different examples associated with the different global groups will be given in the following. In a first example, the two word types "CALIFORNIA" and "California" have been input to the method. These word types are case variants of a common word type. The case variant "CALIFORNIA" is assigned to the first local group and the case variant "California" is assigned to the second local group. Thus, the two case variants are both assigned to the first global group and will be normalized to the case variant that is assigned to the second local group, i.e. the case variant "California". One reason why the normalization is to the case variant that is assigned to the second local group is that word types assigned to the first global group usually are names that have occurred in a head line (first local group) and in ordinary text (second local group). Thus, the case difference between the two case variants is not considered to be significant, and case variants that are assigned to the first global group are normalized to the case variant that is assigned to the second local group, which is considered to be the normal form.

In a second example, the two word types "SUMMARY" and "summary" have been input to the method. In this example the case variant "SUMMARY" is assigned to the first local group and the case variant "summary" is assigned to the third local group. Thus, the two case variants are both assigned to the second global group and will be normalized to the case variant that is assigned to the third local group, i.e. the case variant "summary". One reason why the normalization is to the case variant that is assigned to the third local group is that word types assigned to the second global group usually are nouns, verbs, prepositions, etc. that have occurred in a head line (first local group) and in ordinary text (third local group). Thus, the case difference between the two case variants is not considered to be significant, and case variants that are assigned to the second global group are normalized to the case variant that is assigned to the third local group which is considered to be the normal form.

In a third example, the two word types "Often" and "often" have been input to the method. In this example the case variant "Often" is assigned to the second local group and the case variant "often" is assigned to the third local group. Thus, the two case variants are both assigned to the third global group and will be normalized to the case variant that is assigned to the third local group, i.e. the case variant "often". One reason why the normalization is to the case variant that is assigned to the third local group is that word types assigned to the third global group usually are nouns, verbs, prepositions, etc. that have occurred both in an initial position of a sentence (second local group) and an internal position of a sentence (third local group). Thus, the case difference is not considered to be significant, and case variants that are assigned to the third global group are normalized to the case variant that is assigned to the third local group, which is considered to be the normal form.

Finally, in a fourth example the three word types "ALICE", "Alice" and "alice" have been input to the method. In this example the case variant "ALICE" is assigned to the first local group, the case variant "Alice" is assigned to the second local group and the case variant "alice" is assigned to the third local group. Thus, the three case variants are all assigned to the fourth global group and will be normalized to the case variant that is assigned to the second local group, i.e. the case variant "Alice". One reason why the normalization is to the case variant that is assigned to the second local group is that word types assigned to the fourth global group usually are names that have occurred in a head line (first local group), in ordinary text (second local group) and in, for example, an e-mail address (third local group). Thus, the case difference is not considered to be significant, and case variants that are assigned to the fourth global group are normalized to the case variant that is assigned to the second local group, which is considered to be the normal form.

Figure 2:
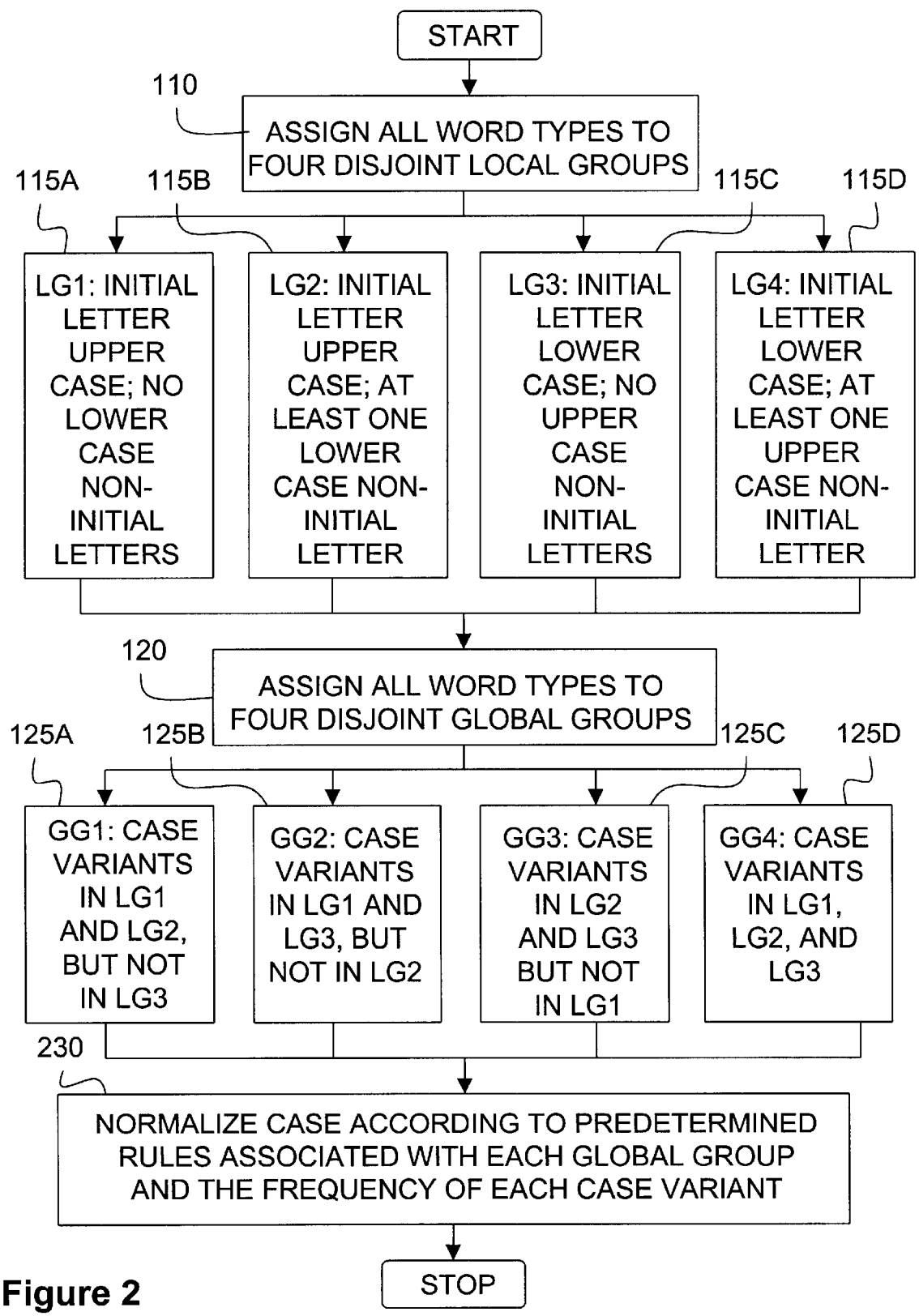
FIG. 2 is a flowchart of a second embodiment of a method according to the invention.

In FIG. 2 a flowchart of a second embodiment of a method according to the invention is shown. As in the embodiment described with reference to FIG. 1, a number of word types that have been identified in a large text database comprising natural language text are input to a computer. According to this second embodiment, each input word type is also associated with a frequency indicating the number of occurrences of the input word type in the natural language text. The steps of assigning the word types to the local groups and the global groups do not differ from the first embodiment. Thus, these are not described further here. The difference from the first embodiment occurs in step 230 where case is normalized. In this embodiment, the case of an input word type is normalized in accordance with predetermined rules associated with (1) the global group of the input word type and (2) the frequency of each case variant of the input word type. More specifically, for input word types that are assigned to the first global group, the second global group, or the third global group, case is normalized to the case of the case variant of the input word type that has the largest frequency. In the case of low frequency ties between case variants, case is normalized to the default normal form of the respective global group. In the case of high frequency ties, the difference between case variants is significant, and normalization is blocked. For input word types that are assigned to the fourth global group there are two alternatives. If the frequency of the case variant that is assigned to the second local group is larger than the frequency of the case variant that is assigned to the first local group, then case is normalized to the case variant that is assigned to the second local group. If the frequency of the case variant that is assigned to the second local group is less than the frequency of the case variant that is assigned to the first local group, then the case of the input word type is normalized to the case variant that is assigned to the first local group. The treatment of the second pair consisting of the case variant assigned to the first local group and the case variant assigned to third local group is analogous.

To exemplify the embodiment described with reference to FIG. 2, two different examples associated with different global groups will be given in the following. In a first example, the two word types "UNESCO" and "Unesco" have been input to the method. These word types are case variants of a common word type. The case variant "UNESCO" is assigned to the first local group and the case variant "Unesco" is assigned to the second local group. In this example the two case variants are associated with their respective frequencies and the frequency of the case variant "UNESCO" is larger than the frequency of the case variant "Unesco". Thus, even though the case variants are assigned to the first global group, for which the default normal form is the case variant assigned to the second local group, they will be normalized to the case variant that is assigned to the first local group instead, i.e. the case variant "UNESCO". This is due to the fact that the respective frequencies of the case variants override the predetermined rules associated with the global group. In this example the case variants are acronyms for which the case variant assigned to the first global group is considered to be the normal form.

In a second example the three word types "ATM", "Atm" and "atm" have been input to the method. In this example the three case variants are associated with their frequencies, and the frequency of the case variant "ATM" is larger than the frequency of the case variant "Atm". Thus, even though case variants are assigned to the fourth global group, they will be normalized to the case variant that is assigned to the first local group, i.e. the first case variant "ATM". This is due to the fact that the respective frequencies of the case variants override the predetermined rules associated with the global group. In this example the case variants are acronyms for which the case variant assigned to the first global group is considered to be the normal form.

Figure 3:
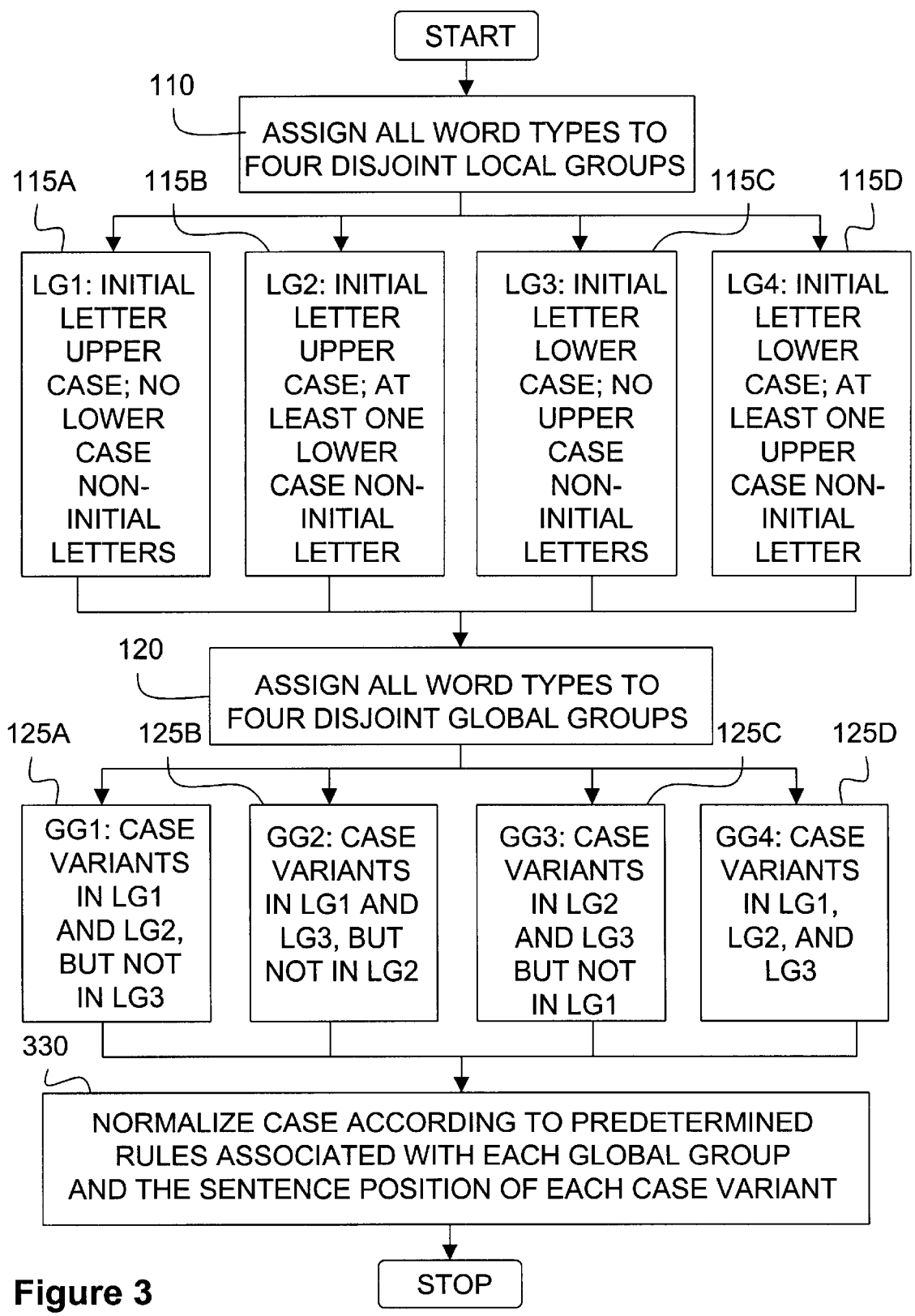
FIG. 3 is a flowchart of a third embodiment of a method according to the invention.

In FIG. 3 a flowchart of a third embodiment of a method according to the invention is shown. As in the embodiment described with reference to FIG. 1, a number of word types that have been identified in a large text database comprising natural language text are input to a computer. According to this third embodiment, each input word type is also associated with a sentence position indicating whether the input word type occurred in an internal position of a sentence and/or in an initial position of a sentence in the natural language text. The steps of assigning the word types to the local groups and the global groups do not differ from the first embodiment. Thus, these are not described further here. The difference from the first embodiment occurs in step 330 where case is normalized. In this embodiment, the case of each input word type is normalized in accordance with predetermined rules associated with (1) the global group of the input word type and (2) the sentence position of each case variant of the input word type. More specifically, the cases of an input word type are normalized according to the same rules as in the embodiment described with reference to FIG. 1 with two exceptions. If an input word type is assigned to the third or fourth global group, the normalization will not be performed if the case variant assigned to the second global group is associated with a sentence position indicating that the input word type occurred in a sentence internal position in the natural language text.

To exemplify the embodiment described with reference to FIG. 3, an example will be given in the following. In the example the two word types "Bill" and "bill" have been input to the method. These word types are case variants of a common word type. The case variant "Bill" is assigned to the second local group and the case variant "bill" is assigned to the third local group. In this example, the two case variants are associated with sentence position information. The sentence position information about the case variant "Bill" indicates that the case variant has occurred in both a sentence initial position and in a sentence internal position in the natural language text. Thus, no normalization of cases will be performed for the case variants "Bill" and "bill". This is due to the fact that the sentence positions of the case variants indicate that the predetermined rules associated with the global group should not be used. In this example the difference of cases between the case variants convey information that should be preserved. More specifically, the case variant "Bill" could both be a name and an ordinary noun. If, on the other hand, the two word types "Car" and "car" have been input to the method, and the sentence position information about the case variant "Car" indicates that this case variant only occurs in a sentence initial position, while the sentence position information about the case variant "car" indicates that this case variant only occurs in a sentence internal position, then the rules of the embodiment described with reference to FIG. 1 would be used and the two case variants are normalized to the case variant that is assigned to the third local group, i.e. the case variant "car".

The embodiments described above can be implemented in a computer program comprising computer-executable instructions for performing the steps. The computer program can then be stored on any computer readable media and the embodiments may then be performed by means of a general purpose computer accessing this media. Furthermore, the embodiments can also be implemented directly in hardware, such as one or more computer processors that are arranged to perform the steps.

What is claimed is:

1. A method for automatically distinguishing significant from insignificant distinctions of upper and lower case in a number of input word types from a natural language text by means of a computer, comprising the steps of:

assigning an input word type to one of a number of disjoint local groups based on the case, and position, of the letters that make up the input word type;

assigning said input word type to one of a number of disjoint global groups based on which local groups case variants of the input word type are assigned to; and normalizing cases for said input word type in accordance with predetermined rules associated with the global group said input word type is assigned to.

2. The method according to claim 1, wherein the step of normalizing cases comprises the step of:

normalizing cases of said input word type according to the cases of the case variant of said input word type that is assigned to a local group that is predetermined for the global group said input word type is assigned to.

3. The method according to claim 1, wherein the step of assigning an input word type to one of a number of disjoint local groups comprises the step of:

assigning an input word type to one of a number of disjoint local groups based on the case of the initial letter of said input word type and the case of the non-initial letters of said input word type.

4. The method according to claim 1, wherein the step of assigning an input word type to one of a number of disjoint local groups comprises the steps of:

assigning an input word type to a number of disjoint local groups based on the case of the initial letter of said input word type and whether there are any non-initial letters of said input word type that are of a different case than the initial letter of the input word type or not.

5. The method according to claim 1, wherein the step of assigning an input word type to one of a number of disjoint local groups comprises the steps of:

assigning an input word type that has an upper case initial letter and no lower case non-initial letters to a first local group;

assigning an input word type that has an upper case initial letter and at least one lower case non-initial letter to a second local group;

assigning an input word type that has a lower case initial letter and no upper case non-initial letters to a third local group; and assigning an input word type that has a lower case initial letter and at least one upper case letter to a fourth local group.

6. The method according to claim 5, wherein the step of assigning said input word type to disjoint global groups comprises the steps of:

assigning said input word type to a first global group, if one case variant of said input word type is assigned to said first local group, one case variant of said input word type is assigned to said second local group, and no case variant of said input word type is assigned to said third local group;

assigning said input word type to a second global group, if one case variant of said input word type is assigned to said first local group, one case variant of said input word type is assigned to said third local group, and no case variant of said input word type is assigned to said second local group;

assigning each input word type to a third global group, if one case variant of said input word type is assigned to said second local group, one case variant of said input word type is assigned to said third local group, and no case variant of said input word type is assigned to said first local group; and assigning each input word type to a fourth global group, if one case variant of said input word type is assigned to said first local group, one case variant of said input word type is assigned to said second local group, and one case variant of said input word type is assigned to said third local group.

7. The method according to claim 6, wherein the step of normalizing cases comprises the steps of:

normalizing cases of said input word type according to the cases of the case variant of said input word type that is assigned to said second local group, if said input word type is assigned to said first global group;

normalizing cases of said input word type according to the cases of the case variant of said input word type that is assigned to said third local group, if said input word type is assigned to said second global group;

normalizing cases of said input word type according to the cases of the case variant of said input word type that is assigned to said third local group, if said input word type is assigned to said third global group; and normalizing cases of said input word type according to the cases of the case variant of said input word type that is assigned to said second local group, if said input word type is assigned to said fourth global group.

8. The method according to claim 1, wherein the input word types each are associated with a frequency indicator indicating the number of occurrences of the input word type in said natural language text, and wherein the step of normalizing comprises the step of:

normalizing cases for said input word type in accordance with predetermined rules associated with the global group said input word type is assigned to and the frequency indicators the case variants of said input word type are associated with.

9. The method according to claim 6, wherein the input word types each are associated with a frequency indicator indicating the number of occurrences of the input word type in said natural language text, and wherein the step of normalizing comprises the step of:

normalizing cases of said input word type according to the cases of the case variant of said input word type that is associated to the largest frequency indicator, if said input word type is assigned to said first global group, said second global group, or said third global group;

normalizing cases of said input word type according to the cases of the case variant of said input word type that is assigned to the second local group, if said input word type is assigned to said fourth global group and the case variant of said input word type that is assigned to said second local group is associated with a frequency indicator that is larger than the frequency indicator that the case variant of said input word type that is assigned to the first local group is associated with; and normalizing cases of said input word type according to the cases of the case variant of said input word type that is assigned to the first local group, if said input word type is assigned to said fourth global group and the case variant of said input word type that is assigned to said second local group is associated with a frequency indicator that is less than the frequency indicator that the case variant of said input word type that is assigned to the first local group is associated with.

10. The method according to claim 1, wherein said input word types each are associated with a sentence position indicator indicating whether the input word type occurred in an internal position of a sentence and/or in an initial position of a sentence in said natural language text, and wherein the step of normalizing comprises the step of:

normalizing cases for said input word type in accordance with predetermined rules associated with the global group said input word type is assigned to and the sentence position indicator the case variants of said input word type are associated with.

11. The method according to claim 6, wherein said input word types each are associated with a sentence position indicator indicating whether the input word type occurred in an internal position of a sentence and/or in an initial position of a sentence in said natural language text, and wherein the step of normalizing comprises the steps of:

normalizing cases of said input word type according to the cases of the case variant of said input word type that is assigned to said second local group, if said input word type is assigned to said first global group;

normalizing cases of said input word type according to the cases of the case variant of said input word type that is assigned to said third local group, if said input word type is assigned to said second global group;

normalizing cases of said input word type according to the cases of the case variant of said input word type that is assigned to said third local group, if said input word type is assigned to said third global group and the case variant of said input word type that is assigned to said second local group is not associated with a sentence position indicator indicating that the input word type occurred in an internal position of a sentence in said natural language text; and normalizing cases of said input word type according to the cases of the case variant of said input word type that is assigned to said second local group, if said input word type is assigned to said fourth global group and the case variant of said input word type that is assigned to said second local group is not associated with a sentence position indicator indicating that the input word type occurred in an internal position of a sentence in said natural language text.

12. The method according to claim 1, further comprising the step of:

storing said input word types with normalized cases in an electronic storage means.

13. A computer processor arranged to perform the steps recited in claim 1.

14. A computer readable medium having computer-executable instructions for a computer to perform the steps recited in claim 1.

15. A computer program comprising computer-executable instructions for a computer to perform the steps recited in claim 1.

* * * * *